(12) United States Patent
Uchida

(10) Patent No.: US 8,982,434 B2
(45) Date of Patent: Mar. 17, 2015

(54) IMAGE PROCESSING APPARATUS, SCANNER APPARATUS, IMAGE PROCESSING APPARATUS CONTROL METHOD, AND SCANNER APPARATUS CONTROL METHOD

(71) Applicant: Canon Denshi Kabushiki Kaisha, Saitama (JP)

(72) Inventor: Ahimusa Uchida, Chichibu (JP)

(73) Assignee: Canon Denshi Kabushiki Kaisha, Saitama (JP)

( * ) Notice: Subject to any disclaimer, the term of this patent is extended or adjusted under 35 U.S.C. 154(b) by 0 days.

(21) Appl. No.: 14/041,813

(22) Filed: Sep. 30, 2013

(65) Prior Publication Data

US 2014/0063574 A1 Mar. 6, 2014

Related U.S. Application Data

(63) Continuation of application No. PCT/JP2012/002285, filed on Apr. 2, 2012.

(30) Foreign Application Priority Data

Apr. 8, 2011 (JP) ................................. 2011-086731

(51) Int. Cl.
*H04N 1/04* (2006.01)
*H04N 1/00* (2006.01)
*H04N 1/203* (2006.01)
*H04N 1/12* (2006.01)

(52) U.S. Cl.
CPC ......... *H04N 1/00596* (2013.01); *H04N 1/2032* (2013.01); *H04N 1/00572* (2013.01); *H04N 1/00655* (2013.01); *H04N 1/1215* (2013.01)
USPC ............ 358/496; 358/497; 358/498; 358/474

(58) Field of Classification Search
USPC .................................. 358/496, 497, 498, 474
See application file for complete search history.

(56) References Cited

U.S. PATENT DOCUMENTS

| 6,665,098 B1 * | 12/2003 | Nagarajan ...................... 358/474 |
| 7,872,783 B2 * | 1/2011 | Kitagawa et al. ............. 358/498 |
| 8,705,150 B2 * | 4/2014 | Shirai et al. ................... 358/498 |
| 2005/0057785 A1 | 3/2005 | Endo ............................. 358/474 |

FOREIGN PATENT DOCUMENTS

| JP | H06-152888 | 5/1994 |
| JP | H09-284478 | 10/1997 |
| JP | H11-266337 | 9/1999 |

(Continued)

*Primary Examiner* — Houshang Safaipour
(74) *Attorney, Agent, or Firm* — Fitzpatrick, Cella, Harper & Scinto

(57) ABSTRACT

An image processing apparatus includes a reception port capable of receiving a paper document. A discharge port discharges a paper document received from the reception port and serves as an ID card reception port. A conveyance path connects the reception port and the discharge port to each other. A conveyance unit conveys the paper document received from the reception port or the ID card received from the discharge port. An image reading unit, provided on the conveyance path, reads a double-sided image of the paper document or the ID card. An image processing unit matches a first image data output condition obtained by reading, by the image reading unit, the paper document received from the reception port, with a second image data output condition obtained by reading, by the image reading unit, the paper document received from the discharge port.

8 Claims, 6 Drawing Sheets

(56) References Cited

FOREIGN PATENT DOCUMENTS

| | | |
|---|---|---|
| JP | 2005-051313 | 2/2005 |
| JP | 2008-270954 | 11/2008 |
| JP | 2011-034168 | 2/2011 |

* cited by examiner

IMAGE PROCESSING APPARATUS, SCANNER APPARATUS, IMAGE PROCESSING APPARATUS CONTROL METHOD, AND SCANNER APPARATUS CONTROL METHOD

TECHNICAL FIELD

The present invention relates to an image reading technique.

BACKGROUND ART

In recent years, to identify an individual, financial institutions and medical institutions perform image reading of an ID card for identifying an individual in addition to image reading of a document. On the other hand, the size of an apparatus has become small. If, however, only the size of a conventional image reading apparatus is made small, an ID card cannot pass through a bent portion of a main conveyance path, and it is thus impossible to read a general document and ID card through the same conveyance path.

To solve this problem, there is provided an image reading apparatus into which an ID card is inserted from a document discharge port. According to PTL1, it is possible to avoid a bent portion of a main conveyance path by reading an ID card at the discharge port and discharging it from a sub-discharge port provided on the rear side of the image reading apparatus.

CITATION LIST

Patent Literature

PTL1: Japanese Patent Laid-Open No. 2008-270954

SUMMARY OF INVENTION

Technical Problem

The arrangement disclosed in PTL1, however, requires processing of matching the result of reading a document with that of reading an ID card, since the ID card is inserted from the document discharge port. The present invention has been made in consideration of the above problem, and has as its object to provide a technique of obtaining an appropriate image reading result for an ID card or the like without any cumbersome user operation.

Solution to Problem

To achieve the object of the present invention, for example, an image processing apparatus according to the present invention is characterized by comprising a reception port capable of receiving a sheet, a discharge port which discharges a sheet received from the reception port and serves as a sheet reception port, a conveyance path which connects the reception port and the discharge port to each other, conveyance means for conveying the sheet received from the reception port or the discharge port, image reading means, provided on the conveyance path, for reading an image of the sheet, image processing means for matching a first image data output condition obtained by reading, by the image reading means, the sheet received from the reception port with a second image data output condition obtained by reading, by the image reading means, the sheet received from the discharge port.

To achieve the object of the present invention, for example, an image processing apparatus according to the present invention which is communicably connected to a scanner apparatus for, upon insertion of an ID card into a discharge port of the scanner apparatus, reading information printed on an obverse surface of the ID card as an obverse surface image and information printed on a reverse surface of the ID card as a reverse surface image is characterized by comprising reception means for receiving the obverse surface image and the reverse surface image transmitted from the scanner apparatus, and output means for, upon receiving ID card reading mode information transmitted from the scanner apparatus in response to insertion of the ID card into the discharge port, performing one of output processing of outputting the obverse surface image received by the reception means as an image representing the reverse surface of the ID card and outputting the reverse surface image received by the reception means as an image representing the obverse surface of the ID card, output processing of outputting a rotated image obtained by rotating the obverse surface image received by the reception means within the obverse surface image through 180° as an image representing the obverse surface of the ID card and outputting a rotated image obtained by rotating the reverse surface image received by the reception means within the reverse surface image through 180° as an image representing the reverse surface of the ID card, and output processing of outputting a rotated image obtained by rotating the obverse surface image received by the reception means within the obverse surface image through 180° as an image representing the reverse surface of the ID card and outputting a rotated image obtained by rotating the reverse surface image received by the reception means within the reverse surface image through 180° as an image representing the obverse surface of the ID card.

To achieve the object of the present invention, for example, a scanner apparatus according to the present invention for, upon insertion of an ID card into a discharge port of the scanner apparatus, reading information printed on an obverse surface of the ID card as an obverse surface image and information printed on a reverse surface of the ID card as a reverse surface image is characterized by comprising output means for performing one of output processing of outputting the obverse surface image as an image representing the reverse surface of the ID card and outputting the reverse surface image as an image representing the obverse surface of the ID card, output processing of outputting a rotated image obtained by rotating the obverse surface image within the obverse surface image through 180° as an image representing the obverse surface of the ID card and outputting a rotated image obtained by rotating the reverse surface image within the reverse surface image through 180° as an image representing the reverse surface of the ID card, and output processing of outputting a rotated image obtained by rotating the obverse surface image within the obverse surface image through 180° as an image representing the reverse surface of the ID card and outputting a rotated image obtained by rotating the reverse surface image within the reverse surface image through 180° as an image representing the obverse surface of the ID card.

To achieve the object of the present invention, for example, a control method of an image processing apparatus according to the present invention is characterized by comprising, when controlling the image processing apparatus including a reception port capable of receiving a sheet, a discharge port which discharges a sheet received from the reception port and serves as a sheet reception port, a conveyance path which connects the reception port and the discharge port to each other, conveyance means for conveying the sheet received from the reception port or the discharge port, and image reading means, provided on the conveyance path, for reading an image of the sheet, performing image processing of matching a first image data output condition obtained by reading, by the image reading means, the sheet received from the reception port with a second image data output condition obtained by reading, by the image reading means, the sheet received from the discharge port.

To achieve the object of the present invention, for example, a control method of an image processing apparatus according to the present invention is characterized by comprising, when controlling the image processing apparatus which is communicably connected to a scanner apparatus for, upon insertion of an ID card into a discharge port of the scanner apparatus, reading information printed on an obverse surface of the ID card as an obverse surface image and information printed on a reverse surface of the ID card as a reverse surface image, a reception step of receiving the obverse surface image and the reverse surface image transmitted from the scanner apparatus, and an output step of, upon receiving ID card reading mode information transmitted from the scanner apparatus in response to insertion of the ID card into the discharge port, performing one of output processing of outputting the obverse surface image received in the reception step as an image representing the reverse surface of the ID card and outputting the reverse surface image received in the reception step as an image representing the obverse surface of the ID card, output processing of outputting a rotated image obtained by rotating the obverse surface image received in the reception step within the obverse surface image through 180° as an image representing the obverse surface of the ID card and outputting a rotated image obtained by rotating the reverse surface image received in the reception step within the reverse surface image through 180° as an image representing the reverse surface of the ID card, and output processing of outputting a rotated image obtained by rotating the obverse surface image received in the reception step within the obverse surface image through 180° as an image representing the reverse surface of the ID card and outputting a rotated image obtained by rotating the reverse surface image received in the reception step within the reverse surface image through 180° as an image representing the obverse surface of the ID card.

To achieve the object of the present invention, for example, a control method of a scanner apparatus according to the present invention is characterized by comprising, when controlling the scanner apparatus for, upon insertion of an ID card into a discharge port of the scanner apparatus, reading information printed on an obverse surface of the ID card as an obverse surface image and information printed on a reverse surface of the ID card as a reverse surface image, performing one of output processing of outputting the obverse surface image as an image representing the reverse surface of the ID card and outputting the reverse surface image as an image representing the obverse surface of the ID card, output processing of outputting a rotated image obtained by rotating the obverse surface image within the obverse surface image through 180° as an image representing the obverse surface of the ID card and outputting a rotated image obtained by rotating the reverse surface image within the reverse surface image through 180° as an image representing the reverse surface of the ID card, and output processing of outputting a rotated image obtained by rotating the obverse surface image within the obverse surface image through 180° as an image representing the reverse surface of the ID card and outputting a rotated image obtained by rotating the reverse surface image within the reverse surface image through 180° as an image representing the obverse surface of the ID card.

Advantageous Effects of Invention

According to an arrangement according to the present invention, it is possible to obtain an appropriate image reading result for an ID card or the like without any cumbersome user operation.

Other features and advantages of the present invention will become apparent from the following description with reference to the accompanying drawings. Note that the same reference numerals denote the same or similar components throughout the accompanying drawings.

BRIEF DESCRIPTION OF DRAWINGS

The accompanying drawings, which are incorporated in and constitute a part of the specification, illustrate exemplary embodiments of the invention and, together with the description, serve to explain the principles of the present invention.

DESCRIPTION OF EMBODIMENTS

Preferred embodiments of the present invention will now be described with reference to the accompanying drawings. The embodiments to be described below are examples when the present invention is practiced concretely, and are detailed embodiments of arrangements described in the appended claims.

[First Embodiment]

Figure 2:
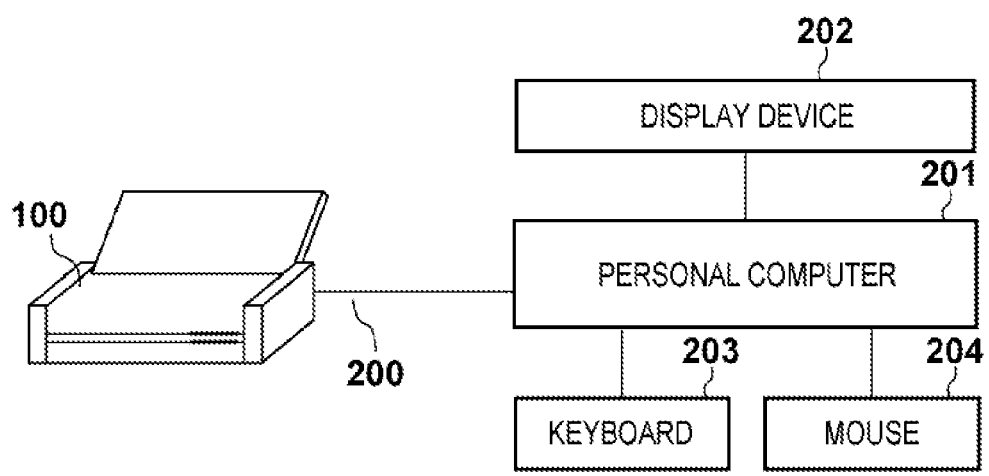
FIG. 2 is a view showing an example of the configuration of a system.

An example of the configuration of a system according to this embodiment will be explained with reference to FIG. 2. As shown in FIG. 2, in the system according to this embodiment, a scanner apparatus 100 which can read an ID card and a personal computer (PC) 201 which functions as an image processing apparatus are connected via an appropriate network line 200 so as to communicate data with each other. The personal computer 201 is connected with a display device 202 which is formed by a CRT or liquid crystal screen, and a keyboard 203 and mouse 204 which are operated by the user to input various instructions to the personal computer 201.

Figure 1:
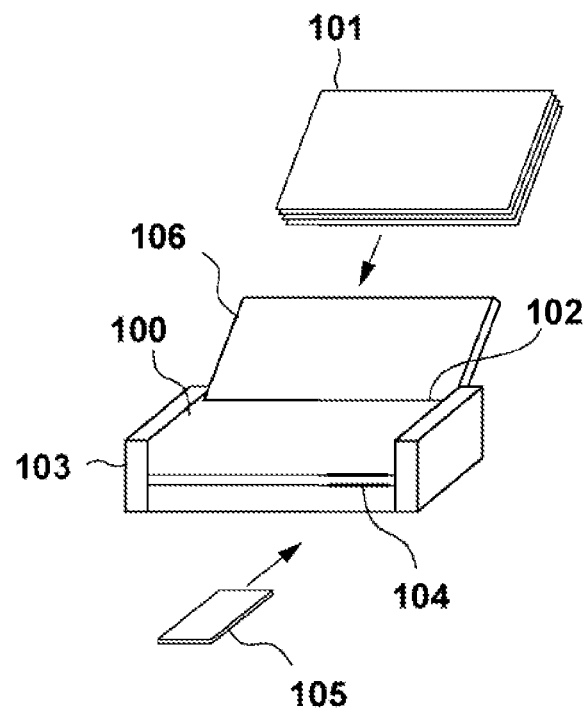
FIG. 1 is a view showing an example of the outer appearance of a scanner apparatus 100.
Figure 4:
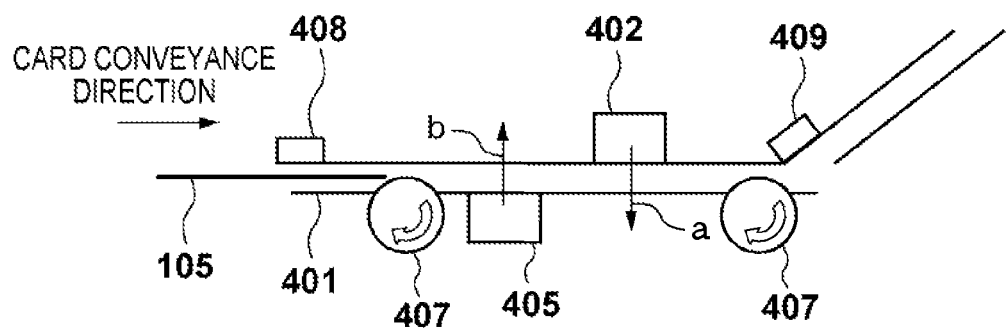
FIG. 4 is a sectional view showing a card insertion port 104.

The scanner apparatus 100 will now be described. FIG. 1 is a view showing an example of the outer appearance of the scanner apparatus 100. The scanner apparatus 100 is an auto document feeder (ADF) apparatus which receives, from a paper feed port (reception port) 102, a document 101 placed on a document table 106, performs image reading for the document 101, and discharges the document 101 from a paper discharge port (discharge port) 103. A card insertion port 104 into which a ID card 105 is inserted is provided in the paper discharge port 103. That is, the paper discharge port 103 also serves as a reception port for the ID card 105. The scanner apparatus 100 then reads, as images, pieces of information printed on the obverse and reverse surfaces of the ID card 105 inserted into the card insertion port 104. FIG. 4 is a sectional view showing the card insertion port 104.

The ID card 105 is inserted into the card insertion port 104 with its obverse surface facing up, its reverse surface facing down, and its upper portion pointing in a card conveyance direction indicated by an arrow in FIG. 4. The user holds the ID card 105 with his/her hand and inserts it into the card insertion port 104 in this way. When the ID card 105 reaches near an insertion sensor 408, the insertion sensor 408 detects the insertion of the ID card 105. When the insertion sensor 408 detects the insertion of the ID card 105, conveyance rollers 407 rotate in a direction (clockwise direction) indicated by arrows shown in FIG. 4, and thus the ID card 105 is conveyed in the card conveyance direction along a conveyance path 401. Note that the conveyance path 401 is generally a path through which the document 101 received from the paper feed port 102 is conveyed in a direction opposite to the card conveyance direction.

An image sensor 402 senses data in the downward direction (indicated by an arrow a) perpendicular to the conveyance path 401. An image sensor 405 senses data in the upward direction (indicated by an arrow b) perpendicular to the conveyance path 401. If, therefore, the ID card 105 is conveyed in the card conveyance direction along the conveyance path 401, the image sensor 402 reads information printed on the obverse surface of the ID card 105 as an obverse surface image. The image sensor 405 reads information printed on the reverse surface of the ID card 105 as a reverse surface image.

When the ID card 105 is conveyed to a position (known) where the image sensor 402 (405) can read information up to the trailing edge of the obverse (reverse) surface of the ID card 105, the conveyance rollers 407 rotate in a direction (counterclockwise direction) opposite to the previous rotation direction. This operation conveys the ID card 105 in a direction opposite to the card conveyance direction along the conveyance path 401, and discharges it from the card insertion port 104.

As described above, upon insertion of the ID card 105 into the card insertion port 104, the scanner apparatus 100 conveys the ID card 105 in the card conveyance direction along the conveyance path 401, and reads its obverse surface and reverse surface as obverse surface image and reverse surface image, respectively. Upon completion of the reading operation, the scanner apparatus 100 conveys (switch-back conveys) the ID card 105 in a direction opposite to the card conveyance direction along the conveyance path 401, and discharges it from the card insertion port 104.

In the image reading processing of the ID card 105 by the scanner apparatus 100 at this time, a double-sided reading operation may be performed before switch-back conveying the ID card 105, that is, in a forward path, or may be performed after switch-back conveying the ID card 105, that is, in a backward path. Alternatively, one surface of the ID card 105 may be read in the forward path, and its other surface may be read in the backward path. Furthermore, an opening communicating with the conveyance path 401 may be provided on the rear surface (opposite to a surface on which the paper discharge port 103 is provided) of the scanner apparatus 100, and the ID card 105 may be received from the card insertion port 104 on the front side of the apparatus, and discharged from the opening on the rear side of the apparatus.

Figure 3:
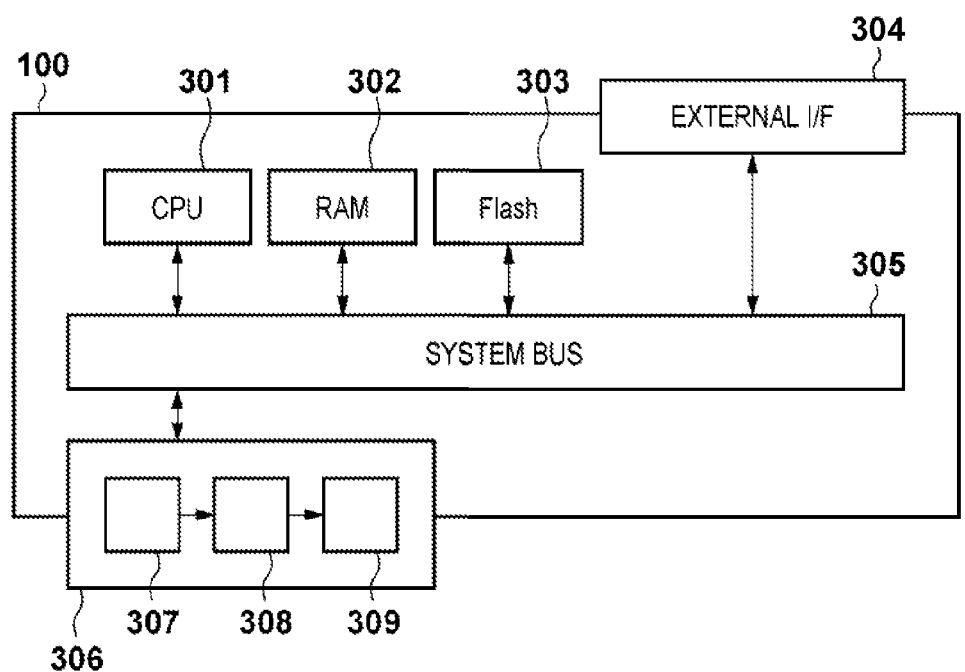
FIG. 3 is a block diagram showing an example of the hardware arrangement of the scanner apparatus 100.

An example of the hardware arrangement of the scanner apparatus 100 will be described with reference to a block diagram shown in FIG. 3. A CPU 301 controls the overall operation of the scanner apparatus 100 using computer programs and data stored in a flash memory (Flash) 303 as a nonvolatile memory and data stored in a RAM 302.

The RAM 302 has a work are used by the CPU 301 to execute various processes, and an area for temporarily storing the obverse surface image and reverse surface image respectively read by the above-described image sensors 402 and 405. That is, the RAM 302 can provide various areas, as needed.

The flash memory 303 stores computer programs and data for causing the CPU 301 to execute respective processes (control processes) to be described later as processes executed by the scanner apparatus 100, various setting data of the scanner apparatus 100, an activation program, and the like.

An operation instruction from an operation unit operable by the user, such as various buttons of the scanner apparatus 100, is sent to the CPU 301 via an external I/F 304. When, for example, the user inputs a scan instruction by operating the operation unit, the scan instruction is sent to the CPU 301 via the external I/F 304. Furthermore, the aforementioned network line 200 is also connected with the external I/F 304. The obverse surface image and reverse surface image read by the scanner apparatus 100 are transmitted to the personal computer 201 via the external I/F 304 and network line 200.

An ADF scanner 306 performs image reading for the ID card 105 using the mechanism shown in FIG. 4 in addition to general scanning, and stores a read image in the RAM 302. The CPU 301 controls the ADF scanner 306.

The ADF scanner 306 includes a line image sensor 307 including the aforementioned image sensors 402 and 405. The ADF scanner 306 also includes an A/D converter 308 which performs analog processing such as amplification and black level clamping for an image signal from the line image sensor 307, and then converts the image signal into digital data (a read image). Furthermore, the ADF scanner 306 includes an image processing unit 309 which controls the operations of the line image sensor 307, A/D converter 308, and the like, and executes various kinds of image processing (for example, shading correction) for the digital data from the A/D converter 308.

The aforementioned units are connected to a system bus 305, and can communicate data with each other via the system bus 305.

Note that the arrangement of the scanner apparatus 100 is not limited to the above-described one. That is, any arrangement may be adopted as long as, at least, when an ID card is inserted into the paper discharge port of the scanner apparatus, it is possible to read information printed on the obverse surface of the ID card as an obverse surface image and information printed on the reverse surface of the ID card as a reverse surface image, and then transmit the read images to the outside.

Figure 8:
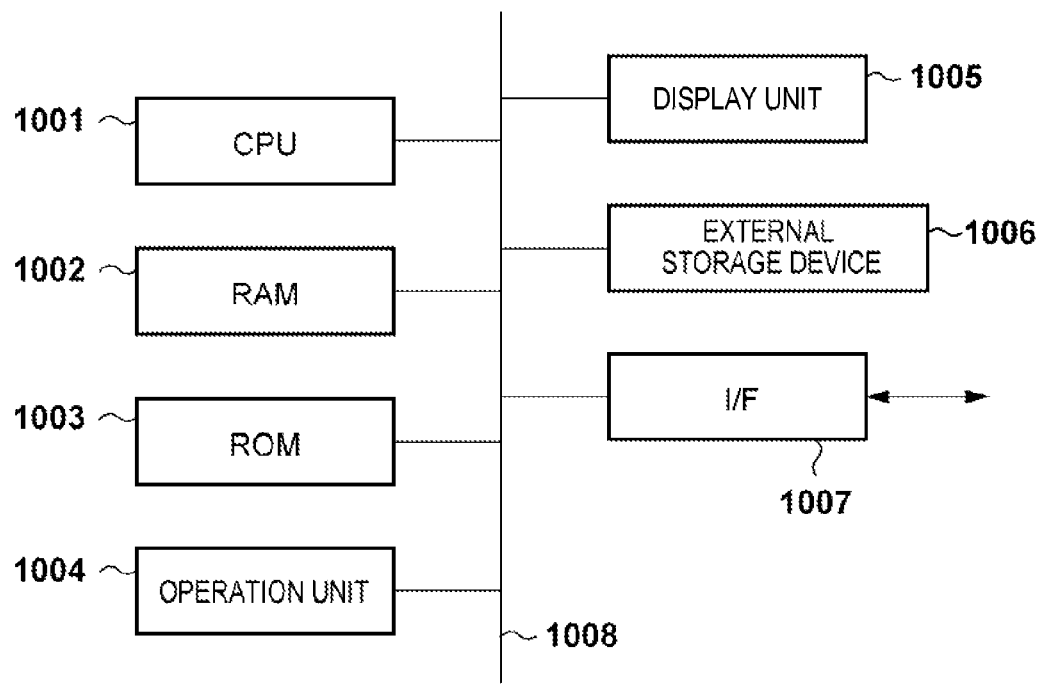
FIG. 8 is a block diagram showing an example of the hardware arrangement of the personal computer 201.

An example of the hardware arrangement of the personal computer 201 will be described with reference to a block diagram shown in FIG. 8. Note that the arrangement of the personal computer 201 is not limited to that shown in FIG. 8.

Any arrangement may be adopted as long as it is possible to execute processing (to be described below) for an image transmitted from the scanner apparatus 100.

A CPU 1001 controls the overall operation of the personal computer 201 using computer programs and data stored in a RAM 1002 and ROM 1003, and executes each process to be described later as a process executed by the personal computer 201.

The RAM 1002 has a work area used by the CPU 1001 to execute various processes, and an area for temporarily storing computer programs and data loaded from an external storage device 1006. The RAM 1002 also has an area for temporarily storing the obverse surface image and reverse surface image received from the scanner apparatus 100 via an I/F 1007. That is, the RAM 1002 can provide various areas, as needed.

The ROM 1003 stores a boot program and various kinds of setting data associated with the personal computer 201.

An operation unit 1004 functions as a user input interface operable by the user, including the keyboard 203 and mouse 204 shown in FIG. 2. Various instructions input by the user by operating the operation unit 1004 are sent to the CPU 1001.

A display unit 1005 corresponds to the display device 202 shown in FIG. 2, and is formed by a CRT or liquid crystal screen. The display unit 1005 can display a processing result by the CPU 1001 using images, characters, or the like.

The external storage device 1006 is a large-capacity information storage device represented by a hard disk drive device. The external storage device 1006 saves an OS (Operating System), and computer programs and data for causing the CPU 1001 to execute respective processes to be described later as processes executed by the personal computer 201. The computer programs include a driver program for controlling the scanner apparatus 100.

The computer programs and data saved in the external storage device 1006 are loaded, as needed, into the RAM 1002 under the control of the CPU 1001, and are processed by the CPU 1001.

The aforementioned units are connected to a bus 1008, and can communicate data with each other via the bus 1008.

Figure 7:
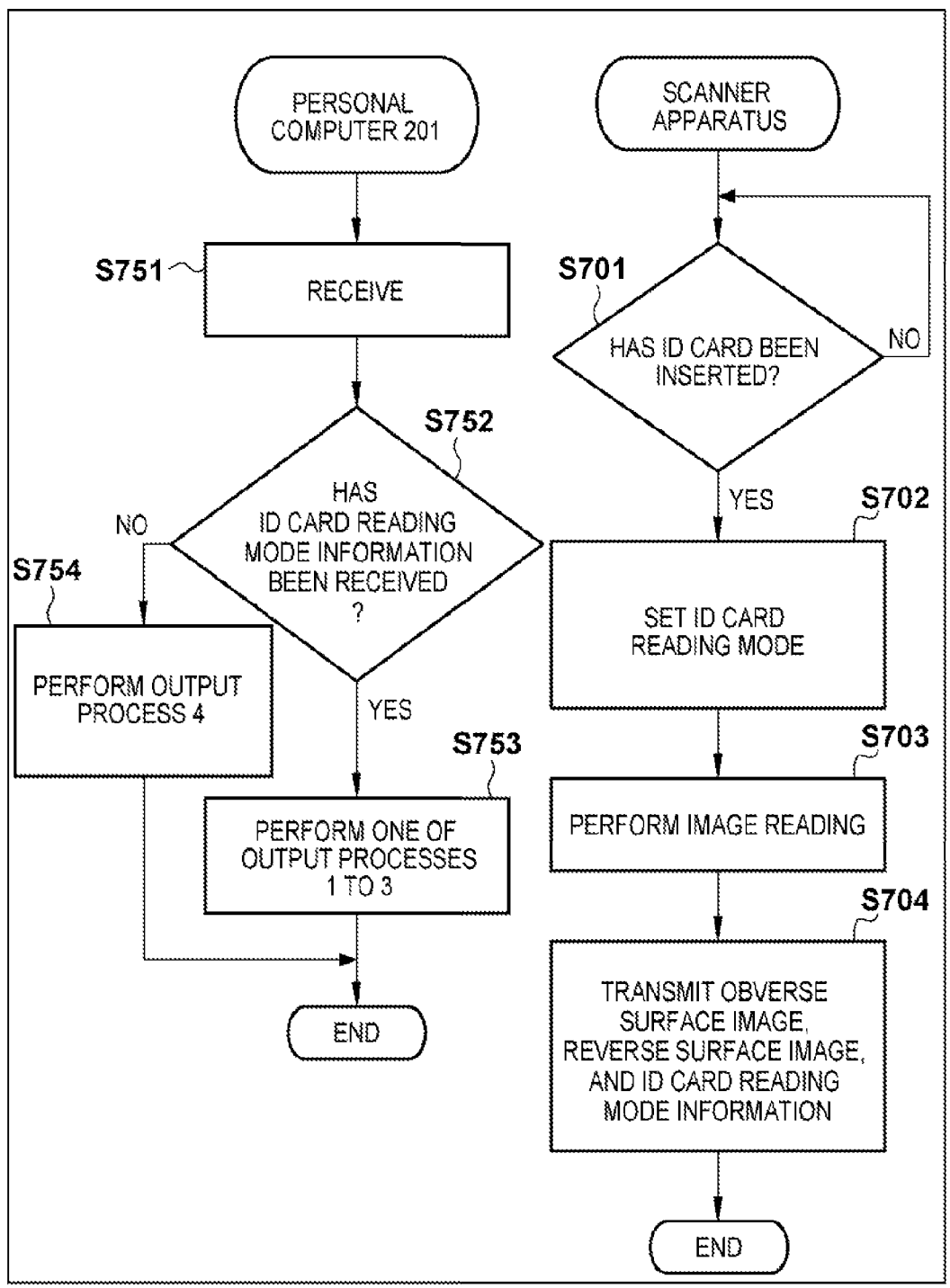
FIG. 7 is a flowchart illustrating processing executed by a personal computer 201 and the scanner apparatus 100.

Processes executed by the personal computer 201 and scanner apparatus 100, respectively, will be described with reference to FIG. 7 which is a flowchart illustrating the processes. Note that the CPU 1001 is a main body for each step of the processing executed by the personal computer 201 and the CPU 301 is a main body for each step of the processing executed by the scanner apparatus 100.

In step S701, the CPU 301 determines whether a signal indicating that the ID card 105 was inserted into the card insertion port 104 has been received from the insertion sensor 408. If, as a result of the determination, the signal has not been received, the CPU 301 returns the process to step S701; otherwise, it advances the process to step S702.

In step S702, the CPU 301 sets the operation mode of the scanner apparatus 100 to an ID card reading mode. Note that when the ID card reading mode is not set, a normal mode is set.

In step S703, the CPU 301 operates the ADF scanner 306 (including the respective units shown in FIG. 4), performs image reading for the ID card 105, and then obtains the obverse surface image and reverse surface image of the ID card 105 in the RAM 302.

In step S704, the CPU 301 transmits ID card reading mode information indicating the ID card reading mode, and the obverse surface image and reverse surface image obtained in the RAM 302 in step S703 to the personal computer 201 via the external I/F 304.

In step S751, the CPU 1001 of the personal computer 201 receives, via the I/F 1007, the ID card reading mode information, obverse surface image, and reverse surface image transmitted from the scanner apparatus 100 via the network line 200. The CPU 1001 then obtains the received ID card reading mode information, obverse surface image, and reverse surface image in the RAM 1002. Note that the ID card reading mode information, obverse surface image, and reverse surface image need not be obtained in the RAM 1002, and may be temporarily saved in the external storage device 1006 and then loaded into the RAM 1002, as needed.

In step S752, the CPU 1001 determines whether the ID card reading mode information has been received from the scanner apparatus 100. If the operation mode of the scanner apparatus 100 is the normal mode (forward drive mode), the scanner apparatus 100 transmits normal mode information indicating the normal mode together with the scanned image. The CPU 1001, therefore, determines whether the mode information received from the scanner apparatus 100 is the ID card reading mode information. If, as a result of the determination, the ID card reading mode information has been received, the process advances to step S753; otherwise, the process advances to step S754.

In step S753, the CPU 1001 executes one of output processes 1 to 3 to be described below.

(Output Process 1) Output Process in which the obverse surface image is output as an image representing the reverse surface of the ID card 105 while the reverse surface image is output as an image representing the obverse surface of the ID card 105.

(Output Process 2) Process in which a rotated image obtained by rotating the obverse surface image within itself through 180° is output as an image representing the obverse surface of the ID card 105 while a rotated image obtained by rotating the reverse surface image within itself through 180° is output as an image representing the reverse surface of the ID card 105.

(Output Process 3) Process in which a rotated image obtained by rotating the obverse surface image within itself through 180° is output as an image representing the reverse surface of the ID card 105 while a rotated image obtained by rotating the reverse surface image within itself through 180° is output as an image representing the obverse surface of the ID card 105.

It may be set in advance which of output processes 1 to 3 is to be executed, or the user may set it through the personal computer 201, as needed. None of output processes 1 to 3 specifically limit an output destination, and images may be output to the display screen of the display unit 1005 or the external storage device 1006.

As described above, the CPU 1001 serves as a means for executing image processing (which may include output processing) of matching the image data output condition of the ID card 105 with an image output condition upon reading in the normal mode.

On the other hand, in step S754, the CPU 1001 outputs the obverse surface image as an image representing the obverse surface of the ID card 105 while outputting the reverse surface image as an image representing the reverse surface of the ID card 105 (output process 4). An output destination in this case is not specifically limited, either, and the images may be output to the display screen of the display unit 1005 or the external storage device 1006.

Figure 5:
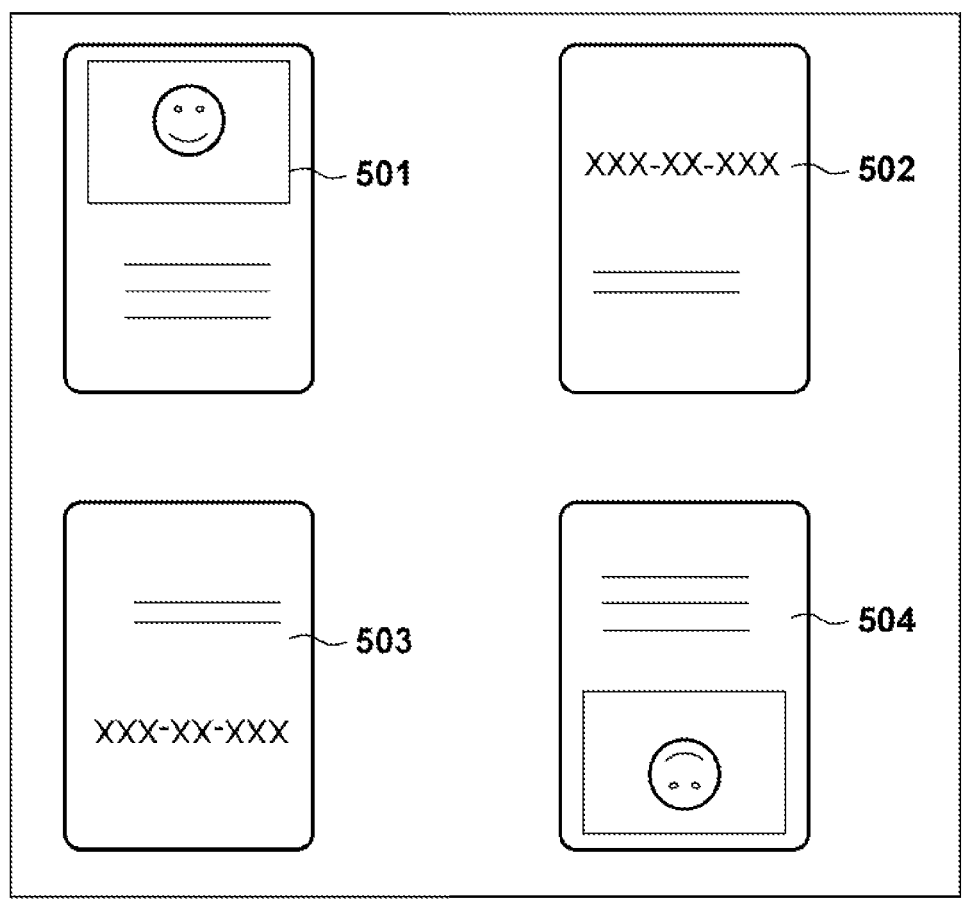
FIG. 5 is a view showing an ID card.

Assume that an ID card with an obverse surface 501 and a reverse surface 502 shown in FIG. 5 is inserted into a conventional scanner apparatus with its obverse surface 501 facing up, and image reading is performed for the ID card. In this case, the scanner apparatus outputs an image 503 turned upside down as a first image and an image 504 turned upside down as a second image. These images are awkward for the user to use.

In this embodiment, however, if the scanner apparatus 100 has performed image reading for the ID card 105, the personal computer 201 outputs the obverse surface image and reverse surface image by performing one of output processes 1 to 3. If, for example, output process 3 is performed to output the obverse surface image and reverse surface image, it is possible to obtain an image representing the obverse surface of the ID card 105 as a first image and an image representing the reverse surface of the ID card 105 as a second image. This improves the usability of the images after scanning.

[Second Embodiment]

In the first embodiment, the scanner apparatus 100 generates an obverse surface image and reverse surface image and transmits them to the personal computer 201. The personal computer 201 then performs one of output processes 1 to 3 described above for the obverse surface image and reverse surface image. However, one of output processes 1 to 3 executed by a personal computer 201 may be performed by a scanner apparatus 100. In this case, after insertion of the ID card 105 into a card insertion port 104, the scanner apparatus 100 obtains the obverse surface image and reverse surface image of an ID card 105, and then executes one of output processes A to C to be described below.

(Output Process A) Output Process in which the obverse surface image is output as an image representing the reverse surface of the ID card while the reverse surface image is output as an image representing the obverse surface of the ID card 105.

(Output Process B) Output Process in which a rotated image obtained by rotating the obverse surface image within itself through 180° is output as an image representing the obverse surface of the ID card 105 while a rotated image obtained by rotating the reverse surface image within itself through 180° is output as an image representing the reverse surface of the ID card 105.

(Output Process C) Output Process in which a rotated image obtained by rotating the obverse surface image within itself through 180° is output as an image representing the reverse surface of the ID card 105 while a rotated image obtained by rotating the reverse surface image within itself through 180° is output as an image representing the obverse surface of the ID card 105.

Note that the output destination of each of output processes A to C is the personal computer 201. In this case, the personal computer 201 may display the images received from the scanner apparatus 100 on the display screen of a display unit 1005 or save the images in an external storage device 1006.

[Third Embodiment]

Figure 6:
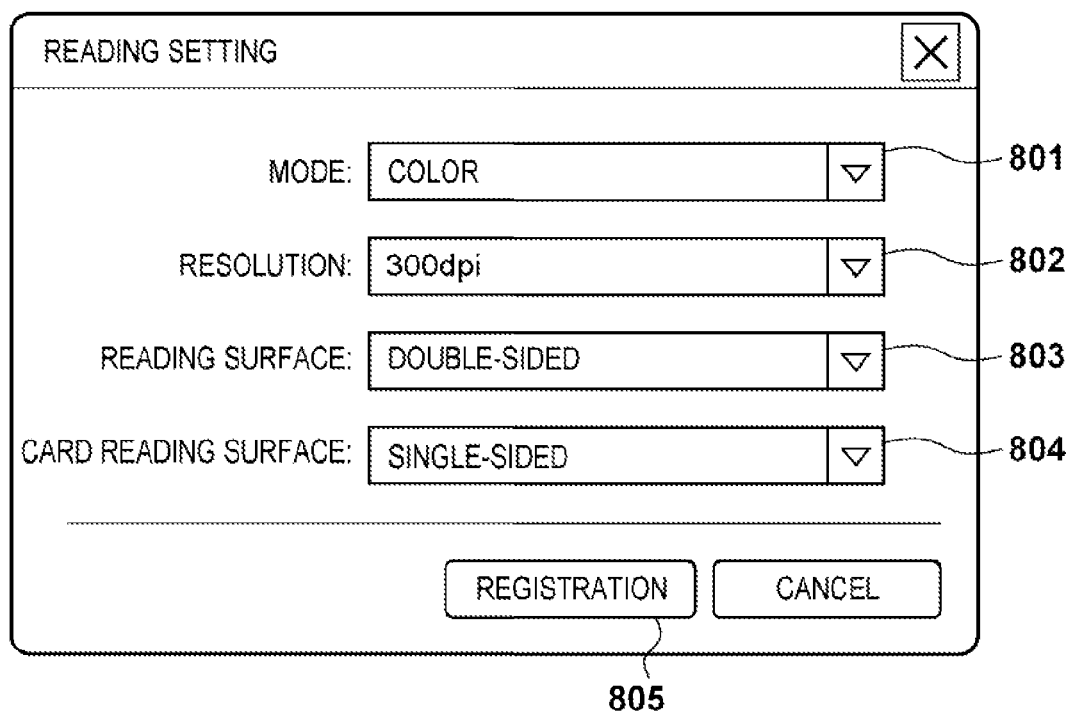
FIG. 6 is a view showing an example of the arrangement of a GUI.

A personal computer 201 may display a GUI (Graphical User Interface) shown in FIG. 6 on the display screen of a display unit 1005, through which image reading settings on the side of a scanner apparatus 100 may be made.

By operating a tab 801 using an operation unit 1004, the user can designate a color mode in image reading, for example, whether image reading is performed in color or monochrome.

By operating a tab 802 using the operation unit 1004, the user can designate a resolution in image reading. Furthermore, by operating a tab 803 using the operation unit 1004, the user can designate whether image reading is performed for only one surface (obverse surface or reverse surface) or both surfaces of a document 101 received from the paper feed port 102.

By operating a tab 804 using the operation unit 1004, the user can designate whether image reading is performed for only one surface (obverse surface or reverse surface) or both surfaces of an ID card 105.

When the user designates contents of the setting items using the GUI shown in FIG. 6 and then instructs a button image 805 using the operation unit 1004, these designated contents are transmitted to the scanner apparatus 100. The scanner apparatus 100 operates based on the designated setting contents.

In the present invention, an image processing apparatus including a sheet reception port and a sheet discharge port can also receive a sheet from the discharge port. In this case, the apparatus is characterized by image processing of matching a first image data output condition obtained by reading, by an image reading means, a sheet received from the reception port with a second image data output condition obtained by reading, by the image reading means, a sheet received from the discharge port. Note that "image data output condition" in the present invention indicates a concept including specifications such as the layout, orientation, and angle of an image and, if both surfaces include images, an obverse or reverse surface, allocation, and layout. Furthermore, "image processing" in the present invention includes the following patterns for example, but is not limited to them.

(1) reception of sheet from discharge port→conveyance→reading of obverse and reverse surfaces→switch-back→discharge of sheet from discharge port In this case, as image processing, images undergo mirror processing to output an obverse surface as a reverse surface and a reverse surface as an obverse surface.

(2) reception of sheet from discharge port→conveyance→switch-back→reading of obverse and reverse surfaces→discharge of sheet from discharge port In this case, as image processing, images are rotated through 180° to output an obverse surface as a reverse surface and a reverse surface as an obverse surface.

(3) reception of sheet from discharge port→conveyance→reading of obverse surface→switch-back→reading of reverse surface→discharge of sheet from discharge port In this case, as image processing, an obverse surface image (obverse image) undergoes mirror processing and is output as a reverse surface, and a reverse surface image (reverse image) is rotated through 180° and output as an obverse surface.

(4) reception of sheet from discharge port→conveyance→reading of reverse surface→switch-back→reading of obverse surface→discharge of sheet from discharge port In this case, as image processing, an obverse surface image is rotated through 180° and output as a reverse surface, and a reverse surface image undergoes mirror processing and is output as an obverse surface.

Note that the above-described "image processing" includes, for example, processing of rotating a document with a relatively large size such as A4 and a card medium such as a license through ±90° and matching the rotation directions with each other, when reading the document and card medium in different conveyance directions. Furthermore, "image processing" includes processing of performing mirror processing for aligning one of images as output results with the other one of the images so that the images are not reversed left to right when the sheet conveyance directions are opposite to each other if a scanning direction (scanning direction: main scanning direction) in image reading is one direction regardless of the sheet conveyance direction (sub-scanning direction). In each of the above-described embodiments, the image reading apparatus for obtaining image data of the obverse and reverse surfaces of an ID card has been exemplified. The present invention is not limited to this, as a matter of course, and is applicable to an image reading apparatus for reading only one surface.

In either case, according to the present invention, it is possible to unify the output formats of resultant image data by combining, as needed, processing of reversing the obverse and reverse surfaces or the upper and lower sides of images, rotation processing, mirror processing, and the like including the above-described patterns, and performing, when conveying a sheet in different conveyance directions, image processing of matching the first image data output condition in one conveyance direction with the second image data output condition in the other conveyance direction (making these output conditions agree with each other). This can significantly reduce subsequent image adjustment operation by the user even if images of a sheet are read in different conveyance modes. Note that "image processing" may match the second image data output condition with the first image data output condition, or vice versa. Furthermore, "image processing" in the present invention includes processing of conveying a sheet to an image reading means (image reading sensor (including an obverse image reading sensor for reading one surface of the sheet as an obverse image and a reverse surface image reading sensor for reading the other surface of the sheet as a reverse image)) in different conveyance directions, and matching the results (image reading results) obtained by reading the images of the sheet with predetermined specifications, for example, layout specifications such as the orientation, and obverse or reverse surface of an image, in order to eliminate any cumbersome user operation.

Such "image processing" may be individually set in advance by the user using an operation button or the like on the image reading apparatus side, or set by the user using a control program (driver, application, or the like) for controlling the image reading apparatus, which is executed by an information processing apparatus such as a PC. Note that in the present invention, "image processing" may switch between processes or change settings (including reversing the scanning direction of the image reading sensor laterally in accordance with the conveyance mode), as needed, by considering the fact that the power state and the like are different depending on the driving state of the image reading apparatus, that is, switching of the conveyance mode and the connection state (for example, a connection state according to the USB 2.0 standard or that according to the USB 3.0 standard) with the information processing apparatus.

Regarding this conveyance, conveyance control of switching between a forward drive mode in which a conveyance unit is forwardly driven from the reception port toward the image reading means and a reverse drive mode in which the conveyance unit is reversely driven from the discharge port toward the image reading means is performed. In this conveyance control, when a sheet is received from the discharge port, the conveyance unit is reversely driven to pass the sheet through an image reading region facing the image reading means, the conveyance unit is then switched to the forward drive mode, and the sheet is discharged from the discharge port.

The image reading apparatus characterized by having the following components has been described above:
  an introduction port (reception port) for introducing a read medium (sheet) into the image reading apparatus;
  a discharge port for discharging the read medium outside the image reading apparatus;
  a conveyance unit which is provided on a conveyance path from the introduction port to the discharge port, and conveys the read medium introduced in the introduction port toward the discharge port;
  an image reading means (image sensor) for reading an image of the read medium conveyed through the conveyance path by the conveyance unit; and
  an image processing means for matching a first image data output condition obtained by reading, by the image reading means, the sheet received from the introduction port with a second image data output condition obtained by reading, by the image reading means, the sheet received from the discharge port.

The image reading apparatus (scanner apparatus) need not always have the function of the image processing means. For example, as in the second embodiment, an information processing apparatus (for example, a personal computer) communicable with the image reading apparatus may have the function of the image means. The function of the image processing means may be implemented by cooperation of the image reading apparatus and the information processing apparatus, as a matter of course. That is, the aforementioned components may be included in only the image reading apparatus or in a system including the image reading apparatus and information processing apparatus.

The present invention is not limited to the aforementioned embodiments, and various changes and modifications can be made without departing from the spirit and scope of the present invention. Therefore, to apprise the public of the scope of the present invention, the following claims are made.

This application claims the benefit of Japanese Patent Application No. 2011-086731, filed Apr. 8, 2011, which is hereby incorporated by reference herein in its entirety.

The invention claimed is:

1. An image processing apparatus comprising:
  a reception port capable of receiving a paper document;
  a discharge port that discharges a paper document received from said reception port and serves as an ID card reception port;
  a conveyance path that connects said reception port and said discharge port to each other;
  a conveyance unit that conveys the paper document received from said reception port or the ID card received from said discharge port;
  an image reading unit, provided on said conveyance path, that reads a double-sided image of the paper document or the ID card; and
  an image processing unit that matches a first image data output condition obtained by reading, by said image reading unit, the paper document received from said reception port, with a second image data output condition obtained by reading, by said image reading unit, the ID card received from said discharge port.

2. The image processing apparatus according to claim 1, wherein said image processing unit matches the second image data output condition with the first image data output condition.

3. The image processing apparatus according to claim 1, wherein said image processing unit matches orientations of images as the image data output conditions with each other.

4. The image processing apparatus according to claim 1, wherein said image processing unit matches the obverse or reverse surfaces of images as the image data output conditions with each other.

5. The image processing apparatus according to claim 1, wherein said image processing unit matches an output condition obtained by reading one surface of the paper document received from said reception port with an output condition obtained by reading the other surface of the ID card received from said discharge port.

6. The image processing apparatus according to claim 1, further comprising a conveyance control unit that controls said conveyance unit, wherein said conveyance control unit is capable of switching between a forward drive mode in which said conveyance unit is forwardly driven from said reception port toward said image reading unit and a reverse drive mode in which said conveyance unit is reversely driven from said discharge port toward said image reading unit.

7. The image processing apparatus according to claim 6, wherein, when an ID card is received from said discharge port, said conveyance control unit reversely drives said conveyance unit to pass the ID card through an image reading region facing said image reading unit, switches said conveyance unit to the forward drive mode, and discharges the ID card from said discharge port.

8. A control method of an image processing apparatus, the control method comprising:

when controlling the image processing apparatus, the image processing apparatus including a reception port capable of receiving a paper document, a discharge port that discharges a paper document received from the reception port and serves as an ID card reception port, a conveyance path that connects the reception port and the discharge port to each other, a conveyance unit that conveys the paper document received from the reception port or the ID card received from the discharge port, and an image reading unit, provided on the conveyance path, that reads a double-sided image of the paper document or the ID card, performing image processing of matching a first image data output condition obtained by reading, by the image reading unit, the paper document received from the reception port, with a second image data output condition obtained by reading, by the image reading unit, the ID card received from the discharge port.

* * * * *